United States Patent
Mortimer et al.

(10) Patent No.: US 6,620,856 B1
(45) Date of Patent: Sep. 16, 2003

(54) PRODUCTION OF CONCENTRATED CARBONATE SUSPENSIONS

(75) Inventors: Mark Daniel Mortimer, Cornwall (GB); John Anthony Purdey, Cornwall (GB); Deborah Susan Thrale, Cornwall (GB); David Robert Skuse, Sandersville, GA (US)

(73) Assignee: Imerys Minerals, Limited, Cornwall (GB)

( * ) Notice: Subject to any disclaimer, the term of this patent is extended or adjusted under 35 U.S.C. 154(b) by 0 days.

(21) Appl. No.: 09/869,039

(22) PCT Filed: Dec. 23, 1999

(86) PCT No.: PCT/GB99/04249

§ 371 (c)(1),
(2), (4) Date: Nov. 9, 2001

(87) PCT Pub. No.: WO00/39029

PCT Pub. Date: Jul. 6, 2000

(30) Foreign Application Priority Data

Dec. 23, 1998 (GB) .............................................. 9828514
Apr. 30, 1999 (GB) .............................................. 9910038

(51) Int. Cl.$^7$ .......................... B01F 17/52; C09C 1/02; C01F 11/18; C01F 5/24
(52) U.S. Cl. ......................... 516/88; 106/464; 106/465; 516/928
(58) Field of Search ........................... 516/88; 106/464, 106/465; 423/430

(56) References Cited

U.S. PATENT DOCUMENTS

| | | | |
|---|---|---|---|
| 3,322,683 A | * 5/1967 | Lester | 516/88 |
| 3,797,610 A | * 3/1974 | Windle | |
| 4,242,318 A | 12/1980 | Brahm et al. | 423/430 |
| 4,383,936 A | * 5/1983 | Franz et al. | 516/88 X |
| 4,509,987 A | * 4/1985 | Farrar et al. | |
| 4,793,985 A | 12/1988 | Price et al. | 423/430 |
| 5,573,188 A | 11/1996 | Bousquet et al. | 241/16 |
| 5,833,747 A | * 11/1998 | Bleakley et al. | 106/464 |
| 6,087,404 A | * 7/2000 | Bown et al. | 516/88 |
| 6,402,824 B1 | * 6/2002 | Freeman et al. | 106/464 |

FOREIGN PATENT DOCUMENTS

| | | |
|---|---|---|
| EP | 0768344 | 4/1997 |
| GB | 1240465 | 7/1971 |
| GB | 1309074 | 3/1973 |
| WO | WO/9825854 | 6/1998 |

* cited by examiner

*Primary Examiner*—Richard D. Lovering
(74) *Attorney, Agent, or Firm*—Finnegan, Henderson, Farabow, Garrett & Dunner, L.L.P.

(57) ABSTRACT

A method of producing a rheologically stable concentrated aqueous suspension of a particulate alkaline earth metal carbonate which method comprises the following steps: (a) preparing a dilute aqueous suspension of the carbonate having a solids content of not more than 40% by weight; (b) dewatering the dilute aqueous suspension to form a carbonate suspension having a solids content in the range of from 45% to 65% by weight; (c) optionally mixing with the dewatered suspension formed in step (b) a dispersing agent for the carbonate to form a fluid suspension; (d) further dewatering the fluid suspension formed in step (b) by thermal evaporation under reduced pressure to raise the solids content of the suspension by a further differential amount of at least 5% by weight; and (e) after at least some of the dewatering in step (c) treating the suspension by a mechanical working process in which at least 1 kW.hr per tonne of carbonate on a dry weight basis is dissipated to refluidise the suspension.

14 Claims, 1 Drawing Sheet

PRODUCTION OF CONCENTRATED CARBONATE SUSPENSIONS

This application is a 371 of PCT/GB 99/04249, filed Dec. 23, 1999, which claims priority based on United Kingdom 9828514.1 filed Dec. 23, 1998 and United Kingdom 9910038.0 filed Apr. 30, 1999.

The present invention relates to the production of concentrated carbonate suspensions, especially calcium carbonate suspensions.

This invention concerns a cost effective process for increasing the solids concentration of a dilute aqueous suspension of a particulate carbonate especially calcium carbonate such as precipitated calcium carbonate, to form a concentrated suspension which is, on the one hand, sufficiently fluid to enable it to be pumped and delivered through pipes or hoses, but, on the other hand, sufficiently viscous to prevent the formation of a sediment of the coarser particles present.

An important factor to be considered if a suspension of particulate carbonate is to be transported in the form of a concentrated aqueous suspension, is that the freight charges will generally be based upon the total weight of the suspension, and it is therefore desirable to minimise the weight of water, and maximise the weight of particulate carbonate in the suspension. Generally, it is found that the solids concentration of the concentrated suspension should be in the range of from about 65% by weight to about 80% by weight of particulate carbonate on a dry weight basis. The calcium carbonate may be prepared in the form of a dilute suspension For example, calcium carbonate prepared by a synthetic route is generally precipitated under conditions such that the product of the precipitation step is a dilute aqueous suspension having a solids content in the range of from about 5% to about 40% by weight. Most frequently, the solids concentration of this suspension will be in the range of from about 15% to about 25% by weight.

A process which has been proposed for increasing the concentration of a dilute aqueous suspension to form a concentrated suspension suitable for transport and storage comprises dewatering the dilute suspension in a tube pressure filter of the type described in GB-A-1240465. This type of pressure filter can be operated at a pressure of up to about 100 bar or more, and can dewater a dilute suspension of precipitated calcium carbonate to produce a cake containing from about 70% to about 74% by weight of calcium carbonate. The cake thus formed must then be mixed with an aqueous solution of a dispersing agent for the calcium carbonate to form a fluid, Theologically stable suspension. A process of this general type is described in EP-A-0768344. Unfortunately this process suffers from the disadvantages that, firstly, the tube pressure filter has been found to be expensive in both capital and maintenance costs, and, secondly, that a considerable amount of energy is required to mix the cake which is formed by the tube pressure filter with a solution of a dispersing agent in order to form a fluid and rheolgically stable suspension.

Other methods have been proposed, e.g. as in U.S. Pat. No. 4242318, to concentrate dilute carbonate dilute suspensions but these do not attain the highest solids concentration possible.

The present invention concerns a method for economically producing a dewatered aqueous suspension of a particulate carbonate which suspension is fluid and Theologically stable and contains a high solids Content which is at least 65%, and is preferably from 70% by weight to about 80%.

According to the present invention there is provided a method of producing a rheologically stable concentrated aqueous suspension of a particulate alkaline earth metal carbonate which method comprises the following steps:

(a) preparing a dilute aqueous suspension of the carbonate having a solids content of not more than 40% by weight;

(b) dewatering the dilute aqueous suspension to form a carbonate suspension having a solids content in the range of from about 45% to about 65% by weight;

(c) optionally mixing with the dewatered suspension formed in step (b) a dispersing agent for the carbonate to form a fluid suspension;

(d) further dewatering the fluid suspension formed in step (b) by thermal evaporation under reduced pressure to raise the solids content of the suspension by a further differential amount of at least 5% by weight; and (e) after at least some of the dewatering in step (c) treating the suspension by a mechanical working process in which at least 1 kW.hr per tonne of carbonate on a dry weight basis is dissipated to re-fluidise the suspension.

Dispersing agent is preferably added before step (d) in the method of the invention, but, if not added at this stage, is preferably added prior to or during working in step (e). If dispersing agent is added prior to evaporative dewatering in step (d), further dispersing agent in one or more doses may be added to the suspension after at least some of the evaporative dewatering in step (d).

The suspension may following the said working step (e) and following further optional dispersing agent addition be dewatered to give a further differential increase in the solids content of the suspension by thermal evaporation under reduced pressure. The further differential increase in solids content after working after some evaporative dewatering may be at least 5% by weight.

The suspension at its maximum concentration following the evaporative dewatering step(s) may be treated by further working and/or dispersing agent addition prior to storage or use.

The suspension obtained as a product of the method of the invention may be a fluid and Theologically stable aqueous suspension of the carbonate having a solids concentration of at least 65% by weight, e.g. at least 68% by weight, in many cases from 70% to 80% by weight.

Preferably, the or each addition of the dispersing agent is accompanied by stirring of the suspension either whilst the dispersing agent is added or after the addition of the dispersing agent. The said working applied may be provided by the said stirring, e.g., by applying the stirring in a blunger, or may be applied separately from and additional to the said stirring.

The working may be applied in at least two steps, namely after some of the said evaporative dewatering followed by further evaporative dewatering and then again later after the further evaporative dewatering. In addition, working may optionally be applied prior to the evaporative dewatering. The working in each in each case may be applied by a mechanical device in one of the ways described later.

The particulate carbonate prepared in step (a) may comprise calcium carbonate although it will be apparent to those skilled in the art that the method of the invention may also be applied to other carbonates such as magnesium carbonate and barium carbonate.

The carbonate in step (a) may be prepared from a natural source, e.g. chalk, marble or limestone, by known grinding procedures. Alternatively, the carbonate may be synthesised. The invention is particularly suitable to treat calcium carbonate which has been prepared by carbonation of lime in a dilute aqueous medium, e.g. by use of carbon dioxide. The carbonate produced in this manner is known as precipitated calcium carbonate.

Where the carbonate prepared in step (a) is a precipitated calcium carbonate, it may be in the calcite, aragonite or vaterite form or a mixture of two or more of these forms or different shapes thereof. The conditions required to produced these various crystal forms and various shapes thereof are well known to those skilled in the art. The vaterite form is thermodynamically unstable at normal temperatures. The aragonite form is metastable under normal ambient condition, but converts to calcite at high temperatures. The calcite form is the most stable, and can exist in several different crystal shapes of which the rhombohedral and scalenohedral shapes are probably the most important.

In step (b) of the method of the invention, the dewatering may be effected by one or more known mechanical devices, e.g. by means of a plate filter press, a vacuum filter, a membrane cross-flow filter or a centrifuge or two or more of these devices. A plate filter press is most preferred. Where a plate filter press is used, it is preferably operated at a pressure in the range of from about 3 bar (300 kPa; 43.5 psig) to about 20 bar (2000 kPa; 290 psig). The plate filter press may advantageously be of the type in which each chamber in which a cake is formed is provided with a flexible diaphragm which is biased against the cake formed on the filter medium by hydraulic or pneumatic pressure in order to expel more water through the pores of the filter medium It will be apparent to those skilled in the art that a known flocculant may be employed to facilitate operation of the dewatering in step (b). The solids content of the suspension prior to step (b) may be less than 30% by weight, in some cases not more than 25% by weight, and the solids content after completion of step (b) and prior to step (c) may be greater than 50% by weight, e.g. from 50% to 60% by weight.

Where dispersing agent is added in at least two steps or doses, the dispersing agent employed may be the same or different. In each case, the dispersing agent is preferably introduced in the form of a concentrated aqueous solution. In each case, it may be added in one or more addition doses at one or more addition sites. The dispersing agent in each case may be selected from the dispersing agents known in the art for the dispersion of particulate carbonate in an aqueous medium. The dispersing agent may, for example, comprise an inorganic agent and/or an organic agent. As inorganic agent, a condensed polyphosphate may be employed. As organic agent an organic polyelctrolyte may be employed. The polyelectrolyte may comprise a polycarboxylate which may be a homopolymer or a copolymer which contains a monomer unit comprising a vinyl or olefinic group which is substituted with at least one carboxylic acid group, or a water soluble salt thereof. Examples of suitable monomer units are acrylic acid, methacrylic acid, itaconic acid, chronic acid, fumaric acid, maleic acid, maleic anhydride, isocrotonic acid, undecylenic acid, angelic acid and hydroxyacrylic acid. The number average molecular weight of the polycarboxylate dispersing agent should not be greater than 20,000, and preferably in the range of from 700 to 10,000, as measured by the method of gel permeation chromatography using a low angle.laser light scattering detector. A particularly preferred dispersing agent, on account of its relatively low cost and ready availability, is partially or fully neutralized sodium polyacrylate. The total effective (dry) amount of the dispersing agent used may generally be in the range of from 0.01% to 2.0% by weight, usually from 0.02% to 1.5% by weight, based on the dry weight of carbonate present.

In step (d) the thermal evaporation is preferably effected by first raising the temperature of the suspension formed in step (b) to within the range of from 60° C. to the boiling point of the suspension, preferably in the range of from 80° C. to 90° C., by a heating means such as a heat exchanger, and then exposing the heated suspension to a reduced pressure, preferably to a vacuum of at least 600 mm of mercury below atmospheric pressure (−0.800 bar), more preferably at least 675 mm of mercury (−0.900 bar), and most preferably at least 700 mm of mercury below atmospheric pressure (−0.933 bar). Conveniently the suspension formed in step (c) is passed through one side of a non-contact heat exchanger through the other side of which is passed a hot fluid, preferably at a temperature in the range of from 60° C. to 100° C. The hot fluid is preferably steam, and is, where possible, waste steam which has been generated in another part of the plant at which the process of the invention is being carried out.

As water is removed from the suspension by thermal evaporation in step (d), the suspension becomes more viscous through the formation of a gel structure in the suspension, and it becomes necessary to subject the suspension to the mechanical working in step (e), preferably with dispersing agent present, in order to break down the gel structure and to restore the desired degree of fluidity to the suspension whereby the suspension may be further dewatered, e.g. by a re-circulating a pumped flow of the suspension through the means providing the evaporative dewatering. Optionally, the working may be accompanied by further dispersing agent addition.

The amount of energy dissipated in the suspension during the mechanical working step (and in each subsequent mechanical working step optionally applied) is at least 1 kW.hr, and is preferably in the range of from about 10 kW.hr to about 100 kW.hr, per tonne, on a dry weight basis, of carbonate in the suspension. Each working step may be applied by passing the suspension through one or more high shear agitation devices capable of dissipating the required rate of energy. The high shear agitation device(s) may be, for example, a mixing vessel equipped with a rotating internal impeller, and/or it may be a high power centrifugal pump which is capable of dissipating the required amount of energy in the suspension.

Where two or more working steps are applied to the suspension, the different working steps may be carried out by the same or different devices.

The required amount of dewatering may be applied to the suspension in step (d) by passing the suspension through heating means and through reduced pressure evaporative dewatering means at least twice. The suspension.:may be recirculated to make multiple passes through the same heating and evaporation means The suspension may also make multiple passes through a mixing vessel where dispersing agent is added and/or through a device in which the suspension is worked following evaporative dewatering.

The or each thermal evaporation treatment of the suspension is preferably effected in a flash tank which is connected to a condenser for water vapour, both the flash tank and the condenser being evacuated to a vacuum of at least −0.8 bar by means of a vacuum pump. The degree of vacuum applied to the flash tank and the condenser is conveniently controlled by means of a valve through which small quantities of air at atmospheric pressure can be admitted into a conduit which connects the vacuum side of the vacuum pump to the flash tank and the condenser. The thermal evaporation system is preferably of the forced circulation type with dewatered product being continuously drawn off at a convenient point in the recirculation loop. It may be advantageous, for reasons of economy, to use more than one stage of flash tank and condenser in the recirculation loop.

The method of the invention may be carried out as a batch, semi-continuous or continuous process.

The present invention allows a carbonate, especially a precipitated calcium carbonate, to be prepared in the form of a dilute suspension and then dewatered to give a concentrated suspension which is flowable, pumpable and transportable and is Theologically stable form at maximum solids. The invention allows the concentrated suspension to be prepared more effectively and in a more economical manner than the methods of the prior art aimed to maximise solids content.

Although the individual steps employed in the method of the invention are known per se (although evaporative dewatering is not used widely on account of its complexity and cost) the selection and use together of these steps as a beneficial combination has not been contemplated in the prior art. In particular, use of step (b) to apply a first stage of dewatering to concentrate the suspension to an intermediate solids level followed by a combination of evaporative dewatering and subsequent mechanical working following dispersing agent addition to complete the dewatering process, allows a higher maximum solids level to be attained in a manner more cost effectively than in prior art processes.

BRIEF DESCRIPTION OF THE DRAWING

An embodiment of the present invention will now be described by way of example with reference to the accompanying drawing in which:

As seen in FIG. 1, a dilute suspension of a precipitated calcium carbonate is supplied to a plate filter press 1 through a conduit 2. When the flow of filtrate has substantially stopped, the cakes formed in the filter press 1 are dropped into a mixing tank 3 provided with rotating stirring means 4. An appropriate amount of a concentrated solution of a dispersing agent for the calcium carbonate is supplied through a conduit 5. As a result of mixing the filter cakes with the dispersing agent, a concentrated suspension of calcium carbonate having a solids concentration in the range of from about 50% to about 601 by weight of calcium carbonate on a dry weight basis is formed. This dispersed suspension is pumped through conduits 6 and 7 by means of a pump 8 to one side of a plate type heat exchanger 9. The pump 8 is conveniently of the single-rotor screw pump type, for example of the Moyno or "MONO"™ type. This type of pump comprises a metal rotor which rotates within and coaxially with an elastomeric stator, the rotor and stator being of such design that the fluid passing through the space between them is compelled to follow a substantially helical path, thereby providing a high shear working action on the suspension. To the other, heating fluid, side of the heat exchanger 9 steam is supplied through a conduit 10. The steam may be waste steam from another process on the same site, or it may, alternatively, be raised specially for this purpose in a boiler. The flow of steam is controlled by means of a valve 11, and the pressure of the steam is monitored by means of a pressure gauge 12. The heated concentrated suspension passes through a conduit 13 to a flash tank 14 which is in communication through a side arm 15 with a condenser 16. The pressure in the flash tank 14 and in the condenser 15 is reduced to at least −0.8 bar relative to atmospheric pressure by means of a vacuum pump 17, which communicates with the condenser 16 through a conduit 18. The degree of vacuum which is exerted in the flash tank and in the condenser is controlled by means of a valve 19 through which a small quantity of air at atmospheric pressure can be admitted into the conduit 18. In the interior of the condenser 16 there is provided a heat exchange coil to which cold water is supplied by a conduit 20, the water being withdrawn through a conduit 21. Condensate collecting in the bottom of the condenser 16 is withdrawn through a conduit 22 by means of a pump 23 and is discharged to a drain through a conduit 24. A mixture of steam and condensed water is withdrawn from the heating fluid side of the heat exchanger 9 by means of the pump 23 through a conduit 25 and a condensate separator 26. Uncondensed steam is passed through a conduit 27 to the condenser 16, while separated water is discharged by means of the pump 23 to the drain. Concentrated calcium carbonate suspension which collects in the bottom of the flash tank 14 is returned through conduits 28 and 29 to a mixing tank 31, which is provided with an internal rotating impeller 32, by means of a powerful centrifugal pump 30, in which the suspension is subjected to high shear working action.

Figure 1:
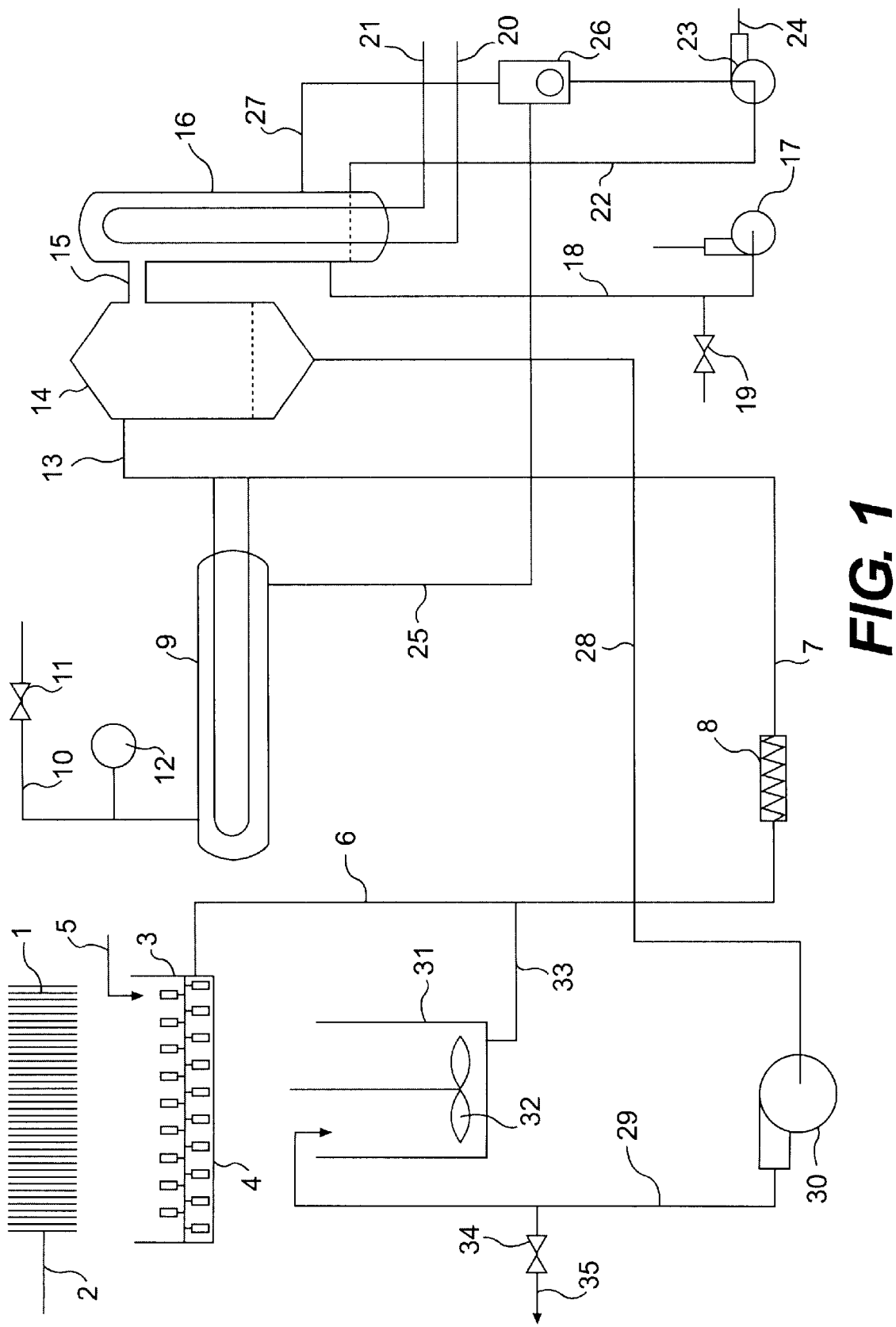
FIG. 1 shows a diagrammatic flow sheet of an arrangement of apparatus in a plant for carrying out a process embodying the invention as applied to the concentration of a precipitated calcium carbonate suspension.

A further amount of energy may also be dissipated in the suspension by means of the rotating impeller 32 in the mixing tank 31. Concentrated suspension is continuously withdrawn from the bottom of mixing tank 31 through a conduit 33, which communicates with conduit 6, by means of pump 8, and is recirculated through the heat exchanger 9 to the flash tank 14. Meanwhile a portion of the recirculating stream of suspension may be withdrawn through a valve 34 and conduit 35 as dewatered product.

A dilute suspension of aragonitic precipitated calcium carbonate was prepared and then treated by a process using apparatus as illustrated in FIG. 1. The calcium carbonate was prepared by the known method of carbonating a dilute aqueous suspension of calcium hydroxide with carbon dioxide gas. The suspension contained 19.9% by weight of dry calcium carbonate and its pH was 8.3. The calcium carbonate prepared had a particle size distribution such that 75% by weight consisted of particles having an equivalent spherical diameter smaller than 0.5 $\mu$m. The dilute suspension was first dewatered in a plate filter press at a pressure of 60–80 psig (414–552 kPa) to form cakes having a solids content of 50–52% by weight of calcium carbonate. These cakes were then discharged into a mixing tank provided with an internal rotating impeller where they were mixed with a concentrated aqueous solution of a sodium polyacrylate dispersing agent to form a fluid suspension. The effective amount of the dispersing agent used was 0.5% by weight of active sodium polyacrylate, based on the dry weight of the calcium carbonate. The suspension thus formed was passed through one side of a plate heat exchanger to the other side of which was fed steam at a temperature in the range of from 82° C. to 90° C. The heated suspension was then passed through a vacuum evaporator in which the vacuum was maintained in the range of from −0.935 to −0.95 bar. Finally the concentrated suspension was returned to the mixing tank to be further recirculated. During the recirculation, further additions of sodium polyacrylate dispersing agent were made as were found necessary to maintain acceptable fluidity of the suspension. On completion of the dewatering process, the total effective amount of sodium polyacrylate dispersing agent present, including the amount initially added, was about 1.1% by weight, based on the dry weight of the calcium carbonate.

When the solids concentration of the recirculating suspension had increased to about 62% by weight of dry calcium carbonate, it was found that the suspension had become unacceptably Theologically dilatant, and the suspension was drawn off into a liquid working tank equipped with a high shear internal impeller, where high shear-mixing was performed for a time such that 23 kW.hr of energy per dry tonne of calcium carbonate was dissipated in the suspension. The suspension, which had again been rendered sufficiently fluid for further treatment, was returned to the recirculation system comprising the mixing tank, heat exchanger and vacuum evaporator, and was recirculated until the solids concentration had increased to 71% by weight. The suspension was then drawn off again into the liquid working tank where it was subjected to high shear mixing for a time such that 24 kW.hr of energy per dry tonne of calcium carbonate was dissipated in the suspension. The total amount of energy dissipated in the suspension was thus 47 kW.hr per tonne of calcium carbonate on a dry weight basis.

At the completion of the second liquid working step, the suspension was found to be sufficiently fluid to allow it to be pumped through pipes or hoses, and was in a suitable form for transport in slurry form, e.g. in a transport tank. It was also found that the resulting suspension could be stored for 7 days without significant increase in viscosity.

What is claimed is:

1. A method of producing a rheologically stable concentrated aqueous suspension of a particulate alkaline earth metal carbonate which method comprises the following steps:
   (a) preparing a dilute aqueous suspension of the carbonate having a solids content of not more than 40% by weight;
   (b) dewatering the dilute aqueous suspension to form a carbonate suspension having a solids content in the range of from 45% to 65% by weight;
   (c) further dewatering the fluid suspension formed in step (b) by thermal evaporation under reduced pressure to raise the solids content of the suspension by a further differential amount of at least 5% by weight; and
   (d) after at least some of the dewatering in step (b) treating the suspension by a mechanical working process in which at least 1 kW.hr per tonne of carbonate on a dry weight bass is dissipated to refluidise the suspension.

2. A method according to claim 1, wherein at least two working steps each preceded by evaporative dewatering under reduced pressure are applied to the suspension following step (b).

3. A method according to claim 1 or claim 2, wherein at least two dispersing agent additions are made to the suspension following step (b) at least one such addition being after at least some evaporative dewatering under reduced pressure.

4. A method according to claim 1, wherein working and/or dispersing agent addition is applied when the suspension has reached its maximum solids concentration following step (c).

5. A method according to claim 1, wherein the energy dissipated during the working is at least 10 kW.hr per dry tonne of carbonate.

6. A method according to claim 1, wherein the suspension has a solids content of not more than 25% by weight prior to step (b), a solids content of from 50% to 65% following step (b) and a solids content of at least 68% by weight following step (c).

7. A method according to claim 1, wherein in step (b) the dewatering is effected by means of a plate filter press, a vacuum filter, a membrane cross-flow filter or a centrifuge.

8. A method according to claim 1, wherein dispersing agent is added in at least one step prior to or during step (c) in a total effective amount of from 0.1% to 2% by weight based on the dry weight of the carbonate present and the dispersing agent is introduced in the form of an aqueous solution.

9. A method according to claim 1, wherein in step (c) the suspension is passed through a heating device wherein the temperature thereof is raised to at least 60° C., after which the suspension is passed into a vessel in which it is exposed to a reduced pressure.

10. A method according to claim 9, wherein the temperature of the suspension is raised to at least 80° C. by passage through the heating device.

11. A method according to claim 9, wherein the pressure is reduced in the said vessel below atmospheric pressure by an amount of at least 600 millimetres of mercury.

12. A method according to claim 9, wherein multiple passes of the suspension by recirculation are made through the heating device and the said vessel.

13. A method as claimed in claim 1, wherein the carbonate comprises a precipitated calcium carbonate.

14. A method as claimed in claim 1, further comprising the step of mixing with the dewatered suspension formed in step (b) a dispersing agent for the carbonate to form a fluid suspension.

* * * * *

UNITED STATES PATENT AND TRADEMARK OFFICE
CERTIFICATE OF CORRECTION

PATENT NO.   : 6,620,856 B1
DATED        : September 16, 2003
INVENTOR(S)  : Mortimer et al.

It is certified that error appears in the above-identified patent and that said Letters Patent is hereby corrected as shown below:

<u>Title page,</u>
Item [73], Assignee, "Imerys Minerals, Limited," should read
-- Imerys Minerals Limited, --.

<u>Column 7,</u>
Line 49, "bass" should read -- basis --.

Signed and Sealed this

Eleventh Day of November, 2003

JAMES E. ROGAN
*Director of the United States Patent and Trademark Office*